(12) United States Patent
Weinert et al.

(10) Patent No.: US 7,248,774 B2
(45) Date of Patent: Jul. 24, 2007

(54) ROUTER HAVING INTERCONNECTED TUBULAR SEGMENTS

(75) Inventors: Stephen J. Weinert, Arlington, TX (US); Michael L. Yeilding, Fremont, CA (US); Douglas A. Florence, Fremont, CA (US); Jack B. Spencer, Jr., Rowlett, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/588,143

(22) Filed: Oct. 26, 2006

(65) Prior Publication Data

US 2007/0041695 A1    Feb. 22, 2007

Related U.S. Application Data

(63) Continuation of application No. 10/988,792, filed on Nov. 15, 2004, now Pat. No. 7,136,566.

(51) Int. Cl.
*G02B 6/00* (2006.01)
*G02B 6/38* (2006.01)

(52) U.S. Cl. ............... 385/137; 385/134; 385/135; 385/136

(58) Field of Classification Search ........ 385/134–137, 385/70–71, 54
See application file for complete search history.

(56) References Cited

U.S. PATENT DOCUMENTS

| | | | |
|---|---|---|---|
| 851,375 | A | 4/1907 | Raymond |
| 1,884,036 | A | 10/1932 | Malone |
| 4,422,478 | A | 12/1983 | Pentney et al. |
| 4,593,442 | A | 6/1986 | Wright et al. |
| 4,944,976 | A | 7/1990 | Plummer, III |
| 5,394,502 | A | 2/1995 | Caron |
| 5,657,413 | A | 8/1997 | Ray et al. |
| 6,049,040 | A | 4/2000 | Biles et al. |
| 6,535,681 | B2 * | 3/2003 | Daoud et al. ............... 385/134 |
| 6,666,415 | B2 | 12/2003 | Hansen |
| 6,774,312 | B2 | 8/2004 | Fatato |

* cited by examiner

*Primary Examiner*—Frank G. Font
*Assistant Examiner*—Michael P. Mooney
(74) *Attorney, Agent, or Firm*—Brooks Kushman P.C.

(57) ABSTRACT

A router includes tubular segments interconnected to one another. Each tubular segment surrounds an interior which accommodates fiber optic jumpers within the tubular segment. A latch of a first one of the tubular segments connects to a connector hole of a second one of the tubular segments to interconnect the first and second tubular segments.

20 Claims, 5 Drawing Sheets

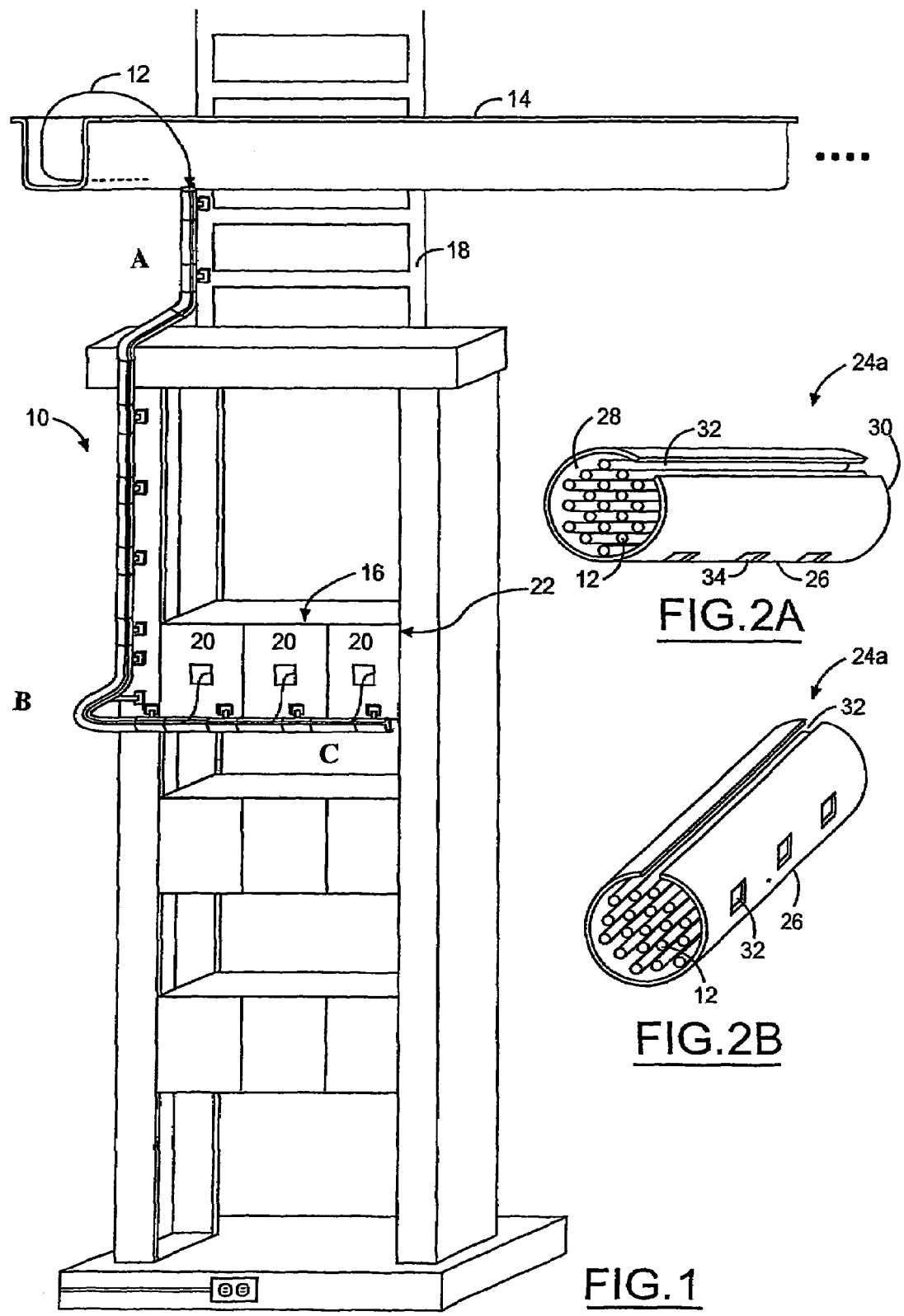

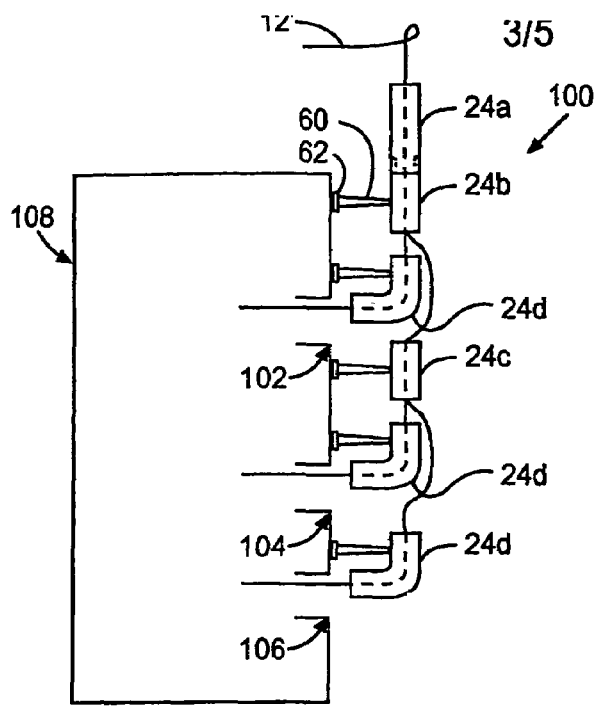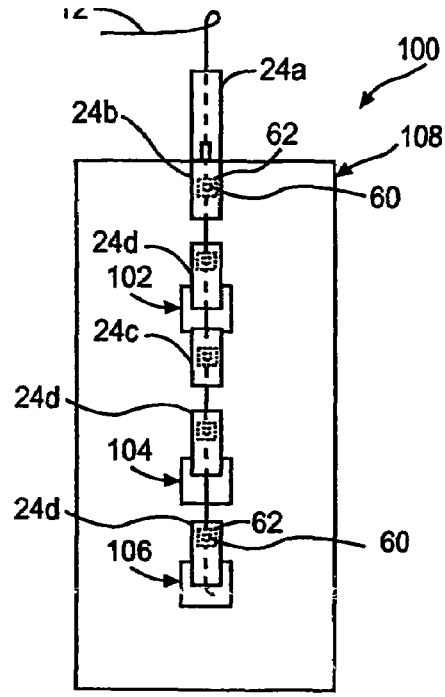
FIG.6A  FIG.6B
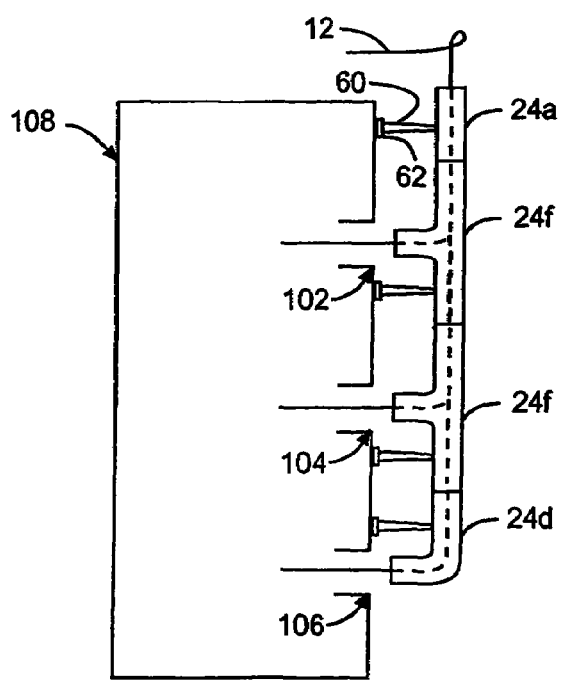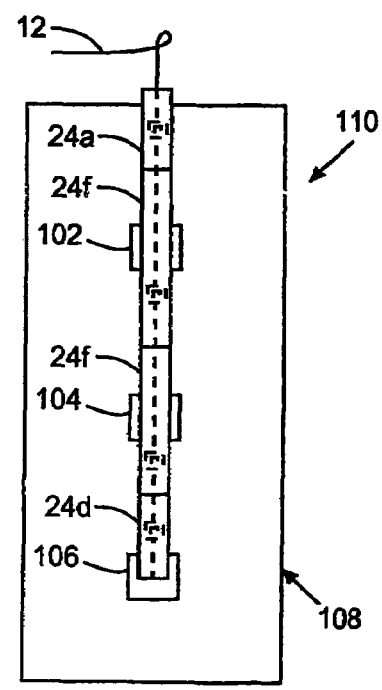
FIG.7A  FIG.7B

ROUTER HAVING INTERCONNECTED TUBULAR SEGMENTS

CROSS-REFERENCE TO RELATED APPLICATIONS

This application is a continuation of U.S. application Ser. No. 10/988,792, filed Nov. 15, 2004, now U.S. Pat. No. 7,136,566 which is hereby incorporated by reference in its entirety.

BACKGROUND OF THE DISCLOSURE

1. Field of the Disclosure

The present disclosure relates to mechanisms for routing and supporting fiber optic jumpers.

2. Background Art

Fiber optic jumpers connect into and out from network equipment in order to communicate optical signals to and from the network equipment. Network equipment includes components arranged within a bay or a lineup of bays. A set of network equipment bays are usually arranged side-by-side in a relay rack. The relay rack is mounted to a stationary structure such as a ladder rack on a given level. Other sets of network equipment bays are arranged in other relay racks which are mounted to the ladder rack on different levels.

A fiber optic jumper trough (i.e., "raceway") is placed above or below the ladder rack. Fiber optic jumpers extend between the raceway and the network equipment. For example, a first group of fiber optic jumpers extends between the raceway and the bays of the first relay rack, a second group of fiber optic jumpers extends between the raceway and the bays of the second relay rack, etc. Sub-sets of fiber optic jumpers extend from each group to an associated bay within a relay rack. For instance, a first sub-set of the first group of fiber optic jumpers extends to the first bay in the first relay rack, a second sub-set of the first group of fiber optic jumpers extends to the second bay in the first relay rack, etc.

Typically, there are a great many fiber optic jumpers for connection from the raceway to a great many network equipment components arranged on the ladder rack. As can be appreciated, the fiber optic jumpers form a congested mess. That is, the configuration of the fiber optic jumpers between the raceway and the network equipment arranged on the ladder rack is likely to be appear as congested, confusing, and irrational to an operator. Further, the portions of the fiber optic jumpers extending between the raceway and the network equipment components on the ladder rack are exposed to the environment and to accidental contact by casual human operators.

BRIEF DESCRIPTION OF THE DRAWINGS

FIG. 1 illustrates a fiber optic jumper routing and securing system for routing and securing fiber optic jumpers between a fiber optic jumper trough and network equipment in accordance with the present disclosure;

FIG. 2A illustrates a side view of a straw-type enclosure for the routing system in accordance with the present disclosure;

FIG. 2B illustrates a perspective view of the straw-type enclosure shown in FIG. 2A;

FIG. 6A illustrates a side view of a routing system in accordance with another embodiment of the present disclosure in which this routing system has an open air-gap configuration and is mounted to a network equipment shelf for routing and securing fiber optic jumpers between a raceway and fiber ports of the network equipment shelf;

FIG. 6B illustrates a frontal view of the routing system shown in FIG. 6A;

FIG. 7A illustrates a side view of a routing system in accordance with another embodiment of the present disclosure in which this routing system has a fully-enclosed configuration and is mounted to a network equipment shelf for routing and securing fiber optic jumpers between a raceway and fiber ports of the network equipment shelf;

FIG. 7B illustrates a frontal view of the routing system shown in FIG. 7A;

DETAILED DESCRIPTION OF THE PREFERRED EMBODIMENT(S)

Figure 3A:
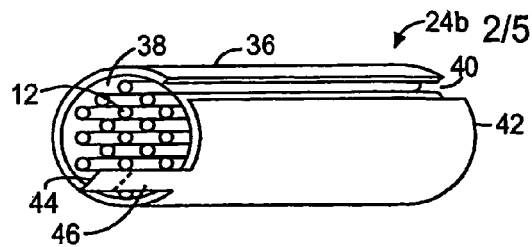
FIG. 3A illustrates a top view of an anchor-type enclosure for the routing system in accordance with the present disclosure.

The present disclosure discloses an embodiment of a router. In this embodiment, the router includes first, second, and third tubular segments interconnected to one another. Each tubular segment surrounds an interior which accommodates fiber optic jumpers within the tubular segment. A latch of the first tubular segment connects to a connector hole of the second tubular segment to interconnect the first and second tubular segments, and a latch of the third tubular segment connects to another connector hole of the second tubular segment to interconnect the second and third tubular segments.

The present disclosure discloses another embodiment of a router. In this embodiment, the router includes tubular segments interconnected to one another. Each tubular segment surrounds an interior which accommodates fiber optic jumpers within the tubular segment. A latch of a first one of the tubular segments connects to a connector hole of a second one of the tubular segments to interconnect the first and second tubular segments. At least one post is associated with at least one of the tubular segments for mounting the router to a given surface.

The present disclosure discloses another embodiment of a router. In this embodiment, the router includes tubular segments interconnected to one another. Each tubular segment surrounds an interior which accommodates fiber optic jumpers within the tubular segment. A latch of a first one of the tubular segments connects to a connector hole of a second one of the tubular segments to interconnect the first and second tubular segments. The tubular segments have slits which open and close to enable placement of fiber optic jumpers within the interiors of the tubular segments.

The advantages of a fiber optic jumper router in accordance with the present disclosure are numerous. The router in accordance with the present disclosure enables operators to place, secure, route, and connect fiber optic jumpers with network equipment. Network equipment is mounted in a ladder rack or the like in various configurations. Such configurations do not account for the placement of volumes of fiber optic jumpers on and around the network equipment. Such jumpers typically extend from a fiber optic jumper trough (i.e., "raceway") positioned away from the network equipment. The router allows an operator to rapidly surround fiber optic jumpers with a safety protective containment material while maintaining their correct bend radius limiters. The correct bend radius limiters are maintained to provide proper strain relief and bend parameters for optimal fiber optic transmissions and characteristics.

A router in accordance with the present disclosure includes a plurality of supporting pieces which are interconnectable with one another. The supporting pieces are interconnectable fiber optic jumper enclosures. A series of enclosures interconnect to form a unique fiber optic jumper router (i.e., a unique routing system). In an embodiment, at least some of the enclosures forming the router are anchored to surfaces of the network equipment and/or the ladder rack. These enclosures are anchored to the network equipment and/or the ladder rack in order to secure the formed fiber optic jumper router to the network equipment and/or the ladder rack.

The enclosures are generally tubular segments having circular cross-sections. The tubular segments are provided in various configurations, shapes, and size and include straight, curved, S-bend, etc., tubular segments. In an embodiment, the tubular segments have a longitudinal slit running along one side which can be easily pried apart by an operator for placement of fiber optic jumpers within the enclosures. Fiber optic jumpers placed inside enclosures run longitudinally into one end of the enclosures and out of the other end of the enclosures. However, the slit enables fiber optic jumpers placed inside enclosures to run longitudinally from one end and then extend out from the slit before reaching the other end if desired.

The enclosures may have different diameters for receiving a number of fiber optic jumpers therein. Preferably, each enclosure has a cross-sectional diameter large enough (about ⅝ inch) to encase a group of up to sixteen fiber optic jumpers. Upon placement of fiber optic jumpers within an enclosure, the sides of the enclosure around the slit close to house the fiber optic jumpers therein.

In operation, an operator selects certain enclosures and interconnects them together to form a router having a unique configuration suitable for placement of fiber optic jumpers in and around the given network equipment configuration. The operator anchors at least some of the enclosures to the network equipment and/or the ladder rack in order to secure the placement of the routing system. The anchoring of the enclosures is done with telephone adhesive, screw-in bolts, etc. The operator then places different portions of fiber optic jumpers within the interconnected enclosures in order to route the fiber optic jumpers to the network equipment such that the enclosures effectively protect and secure the fiber optic jumpers to the network equipment and/or the ladder rack.

Each enclosure is made of a supportive material such as plastic and provides protection to fiber optic jumpers encased therein while allowing the encased fiber optic jumpers to move or slide freely in relation to one another. Each enclosure is malleable to permit slight bending in order to avoid any rigid shear tearing or ripping motions while maintaining the minimum bend radius required for the fiber optic jumpers.

Telecommunication standards generally dictate the following truisms with respect to fiber optic jumpers. Fiber optic jumpers are delicate and therefore have to be protected from the environment. Fiber optic jumpers require a minimum fiber bend radius for all bends. The minimum bend radius for a fiber optic jumper is the minimum of 1.5 inch radius (3.0 inch diameter) or twenty times the diameter of the fiber optic jumper at any point. Fiber optic jumpers are to be able to slide in relation to one another and are not to be artificially constrained or secured permanently at any one point beyond end connector termination points. Connectors and boots of fiber optic jumpers are required to be straight for minimal attenuation of the optical signal. The maximum fiber connector length including the boot away from the mating connector terminating housing should not exceed 2.25 inches. The minimum distance from the connector terminating housing to the completion of any minimum 90° bend of a fiber optic jumper should be at least 3.75 inches. Any cover or door that overlays network equipment with protruding fiber optic jumpers should not touch or provide pressure on the fiber optic jumpers.

A router in accordance with the present disclosure accommodates these features. The router effectively readily affixes fiber optic jumper enclosures (and fiber optic jumpers placed therein) to bays, relay racks, network equipment, or any fixed surface in order to place, secure, route, and connect the fiber optic jumpers.

Referring now to FIG. 1, a fiber optic jumper routing and securing system 10 for routing and securing fiber optic jumpers 12 between a fiber optic jumper trough (i.e., "raceway") 14 and network equipment 16 in accordance with the present disclosure is shown. As shown in FIG. 1, routing system 10 routes and secures a group of fiber optic jumpers 12 between raceway 14 and network equipment 16. Network equipment 16 is mounted on a ladder rack 18 and raceway 14 is placed above the network equipment. Routing system 10 (i.e., router) includes a series of fiber optic jumper enclosures 24 which are interconnected to one another and are mounted to network equipment 16 and/or ladder rack 18 in order to route and secure fiber optic jumpers 12 between raceway 14 and the network equipment.

Fiber optic jumpers 12 extend from routing system 10 into and out of raceway 14. Likewise, fiber optic jumpers 12 extend from routing system 10 into and out of network equipment 16. Network equipment 16 includes a set of network equipment bays 20 which are arranged side-by-side in a relay rack 22. Relay rack 22 is mounted to ladder rack 18 on a given level. Other sets of bays are arranged in other relay racks which are also mounted to ladder rack 18 on different levels.

Raceway 14 is placed above ladder rack 18 and has a horizontal orientation. Typically, raceway 14 is placed on the order of nine to twelve feet away from network equipment 16 on ladder rack 18. Ladder rack 18 generally has a vertical orientation and relay racks 22 generally have a horizontal orientation. As shown in FIG. 1, routing system 10 vertically routes fiber optic jumpers 12 between raceway 14 and ladder rack 18 and then horizontally routes the fiber optic jumpers along network equipment 16.

Routing system 10 includes a plurality of fiber optic jumper enclosures 24. Enclosures 24 are tubular segments having circular cross-sections for receiving fiber optic jumpers therein. As an example, enclosures 24 appear and function as straws. Enclosures 24 have different configurations such as straight, curved, S-bend, 90° bend, splitter, tee, and the like. Enclosures 24 also have different lengths from a fraction of an inch to a couple of feet.

Enclosures 24 interconnect with one another to form routing system 10. Routing system 10 has a given length and unique configuration which depend upon which enclosures 24 are interconnected together. An analogy for interconnecting enclosures 24 to form routing system 10 is a child playing and connecting coffee straws together end-by-end in order to form a combined coffee straw having a much larger length than any individual straw. Interconnecting enclosures 24 together end-by-end effectively forms a combined enclosure (i.e., routing system 10) having a much larger length than any individual enclosure. Further, enclosures 24 have different configurations (such as straight, curved, S-bend) which enable different ones of the enclosures to be connected together to form a combined enclosure (i.e., routing system 10) not only having a relatively larger length than any individual enclosure, but also having a different configuration than the configuration of any individual enclosure.

For example, as shown in FIG. 1, routing system 10 has an overall configuration which includes a bend around the top edge of ladder rack 18, a vertical orientation from this bend to relay rack 22, and then a horizontal orientation along the relay rack. This overall configuration of routing system 10 is formed by interconnecting certain types of enclosures together such as curved enclosures, straight enclosure, S-bend enclosures, etc., in a proper order.

Enclosures 24 are anchored to surfaces of network equipment 16 and/or ladder rack 18 in order to secure routing system 10 to the network equipment and/or the ladder rack. Enclosures 24 are anchored using telephone adhesive, screw-in bolts, etc.

As indicated above, a plurality of different types of enclosures 24 are interconnected together to form routing system 10. The different types of enclosures 24 fall within three general categories: 1) straw-type; 2) anchor-type; and 3) straight-junction mule-type.

The tubular member of each type of enclosure has a slit which separates the sides of the enclosure. An operator pries apart the sides of the enclosure around the slit to place fiber optic jumpers within the enclosure. The sides of the enclosure around the slit close towards the slit once the operator pressure has been removed in order to house the fiber optic jumpers therein.

The straw-type enclosures have straight tubular segments provided with connector holes on the sides of the tubular segments. The tubular segments are of various lengths. The anchor-type enclosures have tubular segments in different configurations such as curved, S-bend, 90° bend, tee, splitter, etc. The tubular segments of many of the anchor-type enclosures have latches on each end. The latches latch into the connector holes of the straw-type enclosures in order to interconnect the straw-type enclosures to the anchor-type enclosures. Anchoring posts and the like are used to anchor the anchor-type enclosures to a given surface. The straight-junction mule-type enclosures have straight tubular segments with latches at each end. The tubular segments of the straight-junction mule enclosures are of various lengths and are void of connector holes. These latches also latch into the connector holes of the straw-type enclosures in order to interconnect the straw-type enclosures to the straight-junction mule-type enclosures. It is noted that anchor-type enclosures and straight-junction mule-type enclosures are generally configurable with/without connector holes and with/without latches.

Referring now to FIGS. 2A and 2B, a straw-type enclosure 24a of routing system 10 in accordance with the present disclosure is shown. Straw-type enclosure 24a includes a straight tubular segment 26 having first and second ends 28, 30. Tubular segment 26 includes a split 32 running longitudinally between ends 28, 30. Split 32 pries apart to enable fiber optic jumpers 12 to be placed within straw-type enclosure 24a. Tubular segment 26 further includes connector holes 34 on its surface. Connector holes 34 receive latches of anchor-type and straight-junction mule-type enclosures in order to interconnect straw-type enclosure 24a to these other enclosures.

Figure 3B:
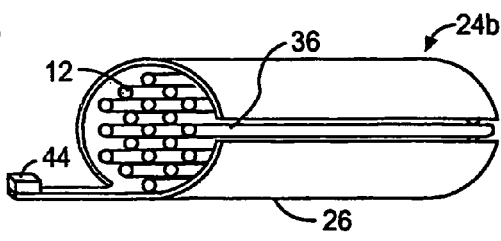
FIG. 3B illustrates a side view of the anchor-type enclosure shown in FIG. 3A.

Referring now to FIGS. 3A and 3B, an anchor-type enclosure 24b of routing system 10 in accordance with the present disclosure is shown. Anchor-type enclosure 24b includes a tubular segment 36 having first and second ends 38, 40. Tubular segment 36 includes a split 42 running longitudinally between ends 38, 40 which allows fiber optic jumpers 12 to be placed inside. Tubular segment 36 further includes a male flange (i.e., a latch) 44 connected by a connection segment 46 to end 38.

Figure 4:
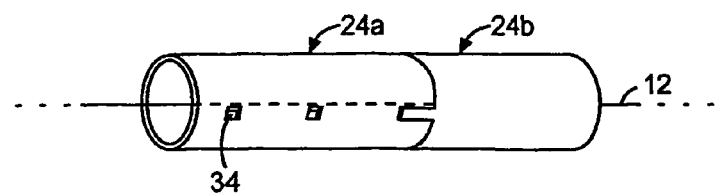
FIG. 4 illustrates a perspective view of the straw-type enclosure shown in FIG. 2 being interconnected to the anchor-type enclosure shown in FIG. 3 in order to form a combined segment of the routing system in accordance with the present disclosure.

Referring now to FIG. 4, straw-type enclosure 24a and anchor-type enclosure 24b are shown as being interconnected. Straw-type enclosure 24a and anchor-type enclosure 24b are interconnected to form a segment of routing system 10. Latch 44 of anchor-type enclosure 24b latches onto a connector hole 34 of straw-type enclosure 24a when an end (28 or 30) of the straw-type enclosure is inserted into end 38 of the anchor-type enclosure in order to interconnect the straw-type enclosure and the anchor-type enclosure together.

Figure 5A:
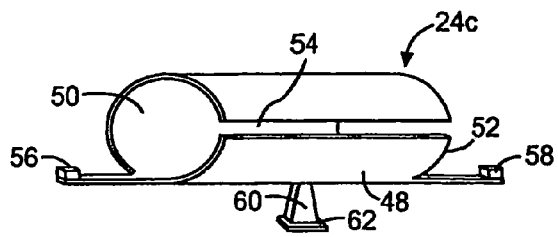
FIG. 5A illustrates a perspective view of a straight-junction mule-type enclosure of the routing system in accordance with the present disclosure with a large-length anchoring post for anchoring this enclosure to a structure.

Referring now to FIG. 5A, a straight-junction mule-type enclosure 24c of routing system 10 in accordance with the present disclosure is shown. Mule-type enclosure 24c includes a straight tubular segment 48 having first and second ends 50, 52 and a split 54 running longitudinally between the ends. Tubular segment 48 further includes latches 56, 58 connected at respective ends 50, 52. An anchoring post 60 connects with the body of tubular segment 48. Anchoring post 60 has a base 62 which is mountable to a structure such as the network equipment 16 and ladder rack 18 in order to anchor mule-type enclosure 24c to the structure.

Figure 5B:
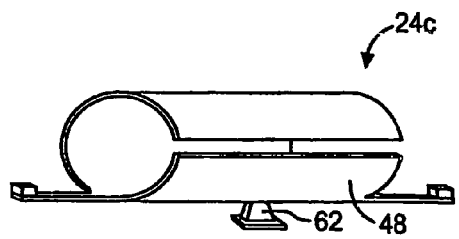
FIG. 5B illustrates a perspective view of the straight-junction mule-type enclosure shown in FIG. 5A with an anchoring base for anchoring this enclosure to a structure.

Referring now to FIG. 5B, mule-type enclosure 24c is shown without an anchoring post. In this case, base 62 directly mounts tubular segment 48 to a structure. As such, tubular segment 48 as shown in FIG. 5B would be relatively close to the structure upon which it is mounted on due to the lack of an anchoring post therebetween whereas tubular segment 48 as shown in FIG. 5A would be positioned away from the structure upon which it is mounted on due to the presence of anchoring post 60 therebetween.

In the same manner as mule-type enclosure 24c, the anchor-type enclosures (as well as the straw-type enclosures) are also mountable by anchoring posts and the like to structures. Further, each enclosure is also mountable to a structure by two or more anchoring posts of different lengths in order to vary the mounting height of the anchor-type enclosure between its ends.

Figure 5C:
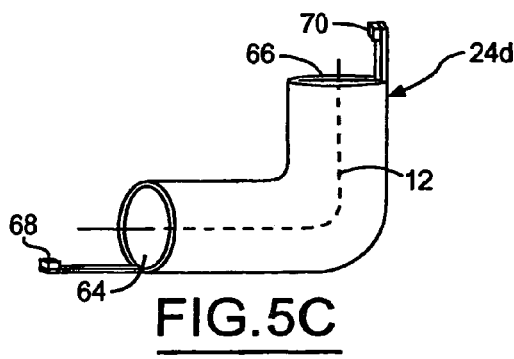
FIG. 5C illustrates a perspective view of a curved anchor-type enclosure of the routing system in accordance with the present disclosure.

The anchor-type enclosures include tubular segments of different lengths, configurations, and shapes. For example, the anchor-type enclosures include a curved anchor-type enclosure 24d as shown in FIG. 5C. Curved anchor-type enclosure 24d includes ends 64, 66 having respective latches 68, 70 connected thereto. Curved anchor-type enclosure 24d changes the orientation of fiber optic jumpers 12 placed therein by 90° between ends 64, 66. The tubular segment of curved anchor-type enclosure 24d has the proper bending radius between ends 64, 66 to accommodate the minimum bending radius of fiber optic jumpers 12.

Figure 5D:
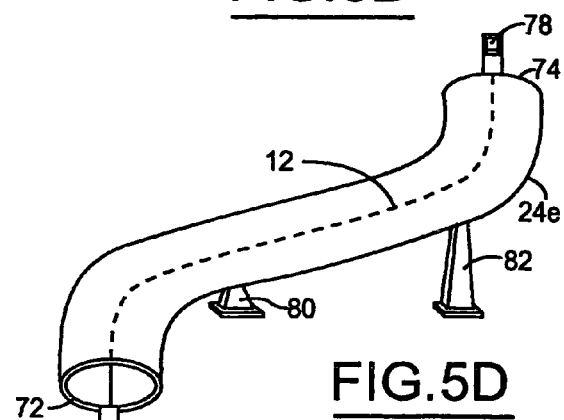
FIG. 5D illustrates a perspective view of an S-bend anchor-type enclosure of the routing system in accordance with the present disclosure.

As another example, the anchor-type enclosures include an S-bend anchor-type enclosure 24e as shown in FIG. 5D. S-bend anchor-type enclosure 24e includes ends 72, 74 having respective latches 76, 78 connected thereto. If desired, ends 72, 74 are mounted by anchoring posts 80, 82 of different lengths to a structure such that end 72 is positioned nearer the structure (e.g., ¼ inch) and end 74 is positioned farther away from the structure (e.g., four inches). Again, the tubular segment of S-bend anchor-type enclosure 24e has the proper bending radius along its body between ends 72, 74 to accommodate the minimum bending radius of fiber optic jumpers 12.

Figure 5E:
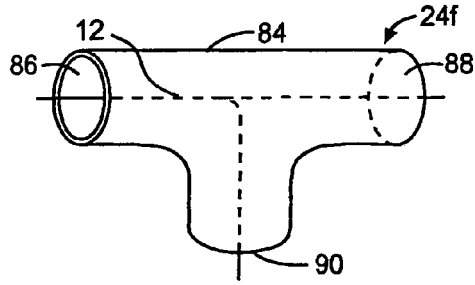
FIG. 5E illustrates a perspective view of a tee anchor-type enclosure of the routing system in accordance with the present disclosure.

As another example, the anchor-type enclosures include a tee anchor-type enclosure 24f as shown in FIG. 5E. Tee anchor-type enclosure 24f includes a tubular body 84 having three ends 86, 88, 90. Tee anchor-type enclosure 24f enables a group of fiber optic jumpers 12 entering end 86 to be routed through end 88 while another group of the fiber optic jumpers is routed by 90° through end 90. Tubular body 84 is designed to have the proper bending radius between ends 86, 88, 90 to accommodate the minimum bending radius of fiber optic jumpers 12.

Figure 5F:
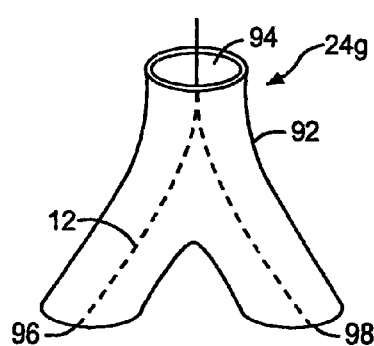
FIG. 5F illustrates a perspective view of a splitter anchor-type enclosure of the routing system in accordance with the present disclosure.

As another example, the anchor-type enclosures include a splitter anchor-type enclosure 24g as shown in FIG. 5F. Splitter anchor-type enclosure 24g includes a tubular body 92 having three ends 94, 96, 98. Splitter anchor-type enclosure 24g enables a group of fiber optic jumpers 12 entering end 94 to be routed through end 96 while another group of the fiber optic jumpers is routed through end 98. Again, tubular body 92 has the proper bending radius between ends 94, 96, 98 to accommodate the minimum bending radius of fiber optic jumpers 12.

Referring now to FIGS. 6A and 6B, a routing system 100 in accordance with another embodiment of the present disclosure is shown. Routing system 100 has an open air-gap configuration. Routing system 100 is mounted to a network equipment shelf 108 for routing and securing fiber optic jumpers 12 between a raceway (not shown) and fiber ports 102, 104, 106 of the network equipment shelf.

Routing system 100 includes a straw-type enclosure 24a for receiving fiber optic jumpers 12 from the raceway. Straw-type enclosure 24a is interconnected to a straight anchor-type enclosure 24b. Anchor-type enclosure 24b is mounted to a front surface of network equipment shelf 108 by an anchoring post 60 and an anchoring base 62. Fiber optic jumpers 12 pass through straw-type enclosure 24a and anchor-type enclosure 24b. A 90° bend anchor-type enclosure 24d is also mounted to a front surface of network equipment shelf 108. The 90° bend anchor-type enclosure 24d directs a group of fiber optic jumpers 12 from anchor-type enclosure 24b into fiber port 102. A straight-junction mule-type component 24c and another 90° bend anchor-type enclosure 24d direct another group of fiber optic jumpers 12 from anchor-type enclosure 24b into fiber port 104 and so on as shown in FIGS. 6A and 6B.

Referring now to FIGS. 7A and 7B, a routing system 110 in accordance with another embodiment of the present disclosure is shown. Routing system 110 has a fully-enclosed configuration and is mounted to network equipment shelf 108 for routing and securing fiber optic jumpers 12 between a raceway and fiber ports 102, 104, 106 of the network equipment shelf. Routing system 110 includes a straw-type enclosure 24a, two tee anchor-type enclosures 24f, and a 90° bend anchor-type enclosure 24d which are interconnected together in the order shown in FIGS. 7A and 7B to form routing system 110.

Figure 8:
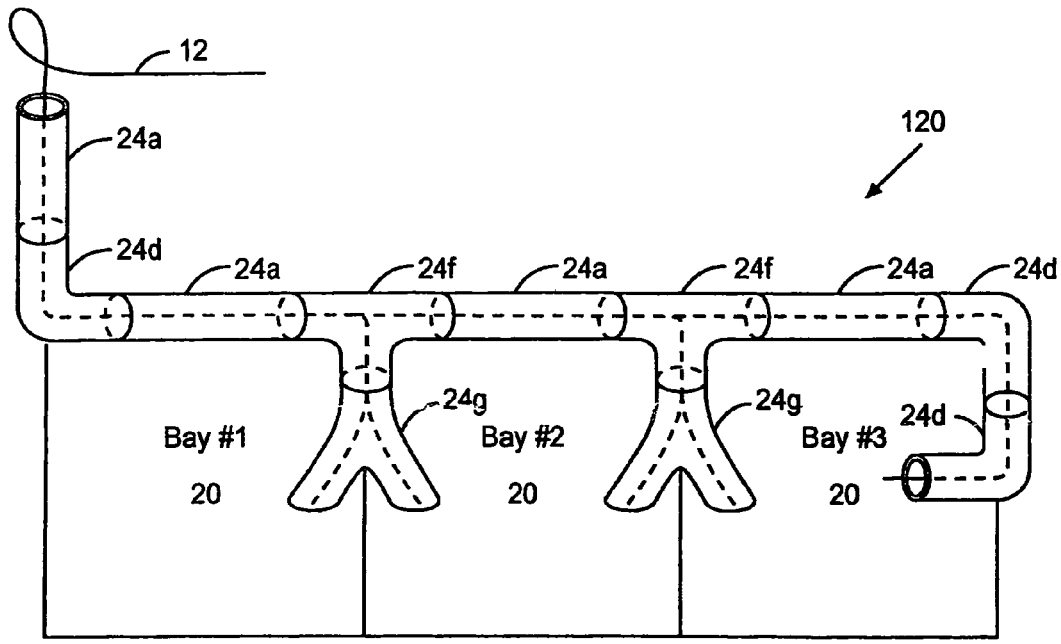
FIG. 8 illustrates a side view of a routing system in accordance with another embodiment of the present disclosure in which this routing system is mounted to a lineup of network equipment bays in order to route and secure fiber optic jumpers between a raceway and the network equipment bays.

Referring now to FIG. 8, a routing system 120 in accordance with another embodiment of the present disclosure is shown. Routing system 120 is mounted to a lineup of network equipment bays 20 in order to route and secure fiber optic jumpers 12 between a raceway (not shown) and the network equipment bays. Routing system 120 includes straw-type enclosures 24a, 90° bend anchor-type enclosures 24d, tee anchor-type enclosures 24f, and splitter anchor-type enclosures 24g which are interconnected together in the order shown in FIG. 8 to form routing system 120.

Figure 9A:
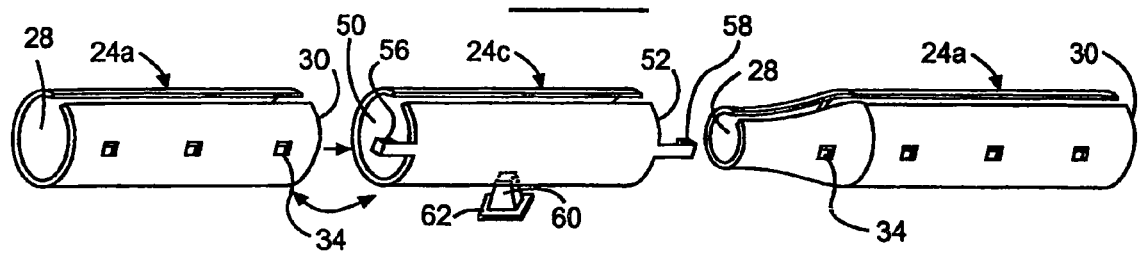
FIG. 9A illustrates a straight-junction mule-type enclosure and two straw-type enclosures positioned to be interconnected to one another for forming a combined segment of the routing system shown adjacent area "A" of FIG. 1.

Referring now to FIG. 9A, a straight-junction mule-type enclosure 24c and two straw-type enclosures 24a are shown in position to be interconnected to one another for forming a combined segment of routing system 10 which is shown adjacent area "A" of FIG. 1. As shown in FIG. 9A, ends 28 and 30 of the two straw-type enclosures 24a are tapered to fit and be inserted within ends 50 and 52 of mule-type enclosure 24c in order to connect with the mule-type enclosure.

Figure 9B:
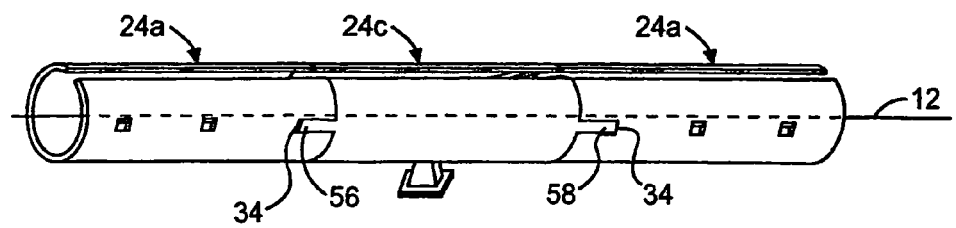
FIG. 9B illustrates the straight-junction mule-type enclosure and the two straw-type enclosures shown in FIG. 9A being interconnected to one another to form the combined segment of the routing system shown adjacent area "A" of FIG. 1.

As shown in FIG. 9B, after the operator inserts an end of the two straw-type enclosures 24a within corresponding ends of mule-type enclosure 24c, the operator moves latches 56 and 58 of the mule-type enclosure into a corresponding connector hole 34 of the straw-type enclosures in order to interconnect the enclosures. The three interconnected enclosures from the combined segment of routing system 10 shown adjacent area "A" of FIG. 1.

Figure 10:
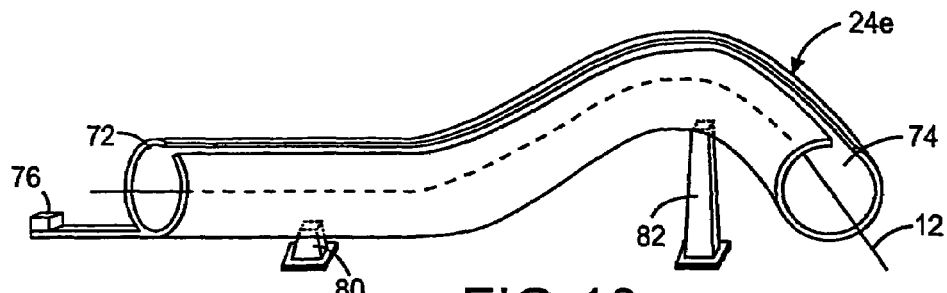
FIG. 10 illustrates an S-bend anchor-type enclosure which forms a segment of the routing system shown adjacent area "B" of FIG. 1.
Figure 12:
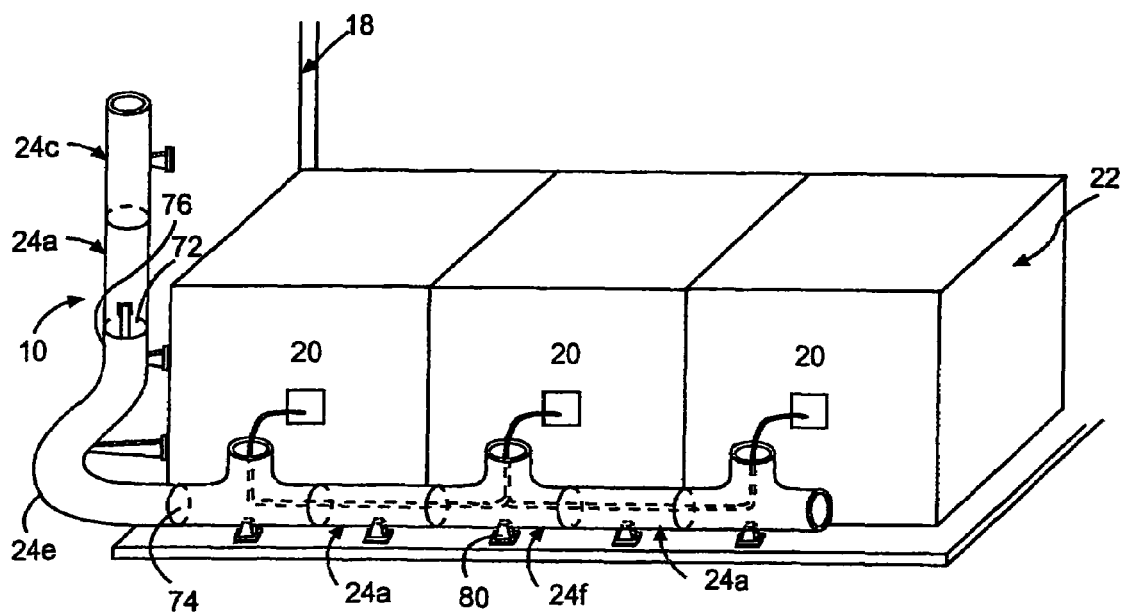
FIG. 12 illustrates a blown-up view of the portion of the routing system adjacent to the network equipment bays of the first relay rack shown in FIG. 1.

Referring now to FIG. 10, with reference to FIG. 12, an S-bend anchor-type enclosure 24e which forms a segment of routing system 10 shown adjacent area "B" of FIG. 1 is shown. S-bend anchor-type enclosure 24e includes a latch 76 for connecting with a connector hole 34 of the adjacent straw-type enclosure 24a in order to connect these two enclosures together to form the combined segment of routing system 10 shown adjacent area "B" of FIG. 1. S-bend anchor-type enclosure 24e further includes small and large anchoring posts 80, 82. Anchoring post 82 is relatively larger in order to elevate the portion the S-bend anchor-type enclosure 24e nearest its end 74 from ladder rack 18. This enables S-bend anchor-type enclosure 24e to bend up and around network equipment bays 20 of relay rack 22 from ladder rack 18.

Figure 11:
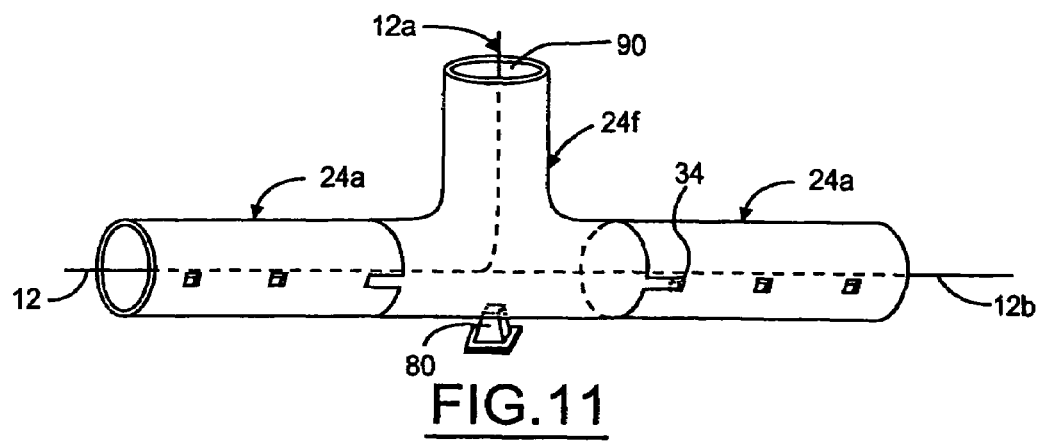
FIG. 11 illustrates a tee anchor-type enclosure interconnected at each end to a straw-type enclosure in order to form the combined segment of the routing system shown adjacent area "C" of FIG. 1.

Referring now to FIG. 11, with reference to FIG. 12, a tee anchor-type enclosure 24f interconnected at each end to a straw-type enclosure 24a in order to form the combined segment of routing system 10 shown adjacent area "C" of FIG. 1 is shown. Fiber optic jumpers 12 are routed through straw-type enclosures 24a and tee anchor-type enclosure 24 as shown in FIG. 11. A first group of fiber optic jumpers 12a break off their route with the rest of the fiber optic jumpers and are routed through end 90 of tee anchor-type enclosure 24f in order to connect with an adjacent bay 20. The remaining group of fiber optic jumpers 12b pass through tee anchor-type enclosure 24f and the next adjacent straw-type enclosure 24a as shown in FIG. 11.

The illustrations of embodiments described herein are intended to provide a general understanding of the structure of various embodiments, and they are not intended to serve as a complete description of all the elements and features of methods and apparatuses that might make use of the structures described herein. Many other embodiments will be apparent to those of skill in the art upon reviewing the above description. Other embodiments may be used and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A router comprising:
   first, second, and third tubular segments interconnected to one another, each tubular segment surrounding an interior which accommodates fiber optic jumpers within the tubular segment;
   wherein a latch of the first tubular segment connects to a connector hole of the second tubular segment to interconnect the first and second tubular segments and a latch of the third tubular segment connects to another connector hole of the second tubular segment to interconnect the second and third tubular segments.

2. The router of claim 1 wherein:
   an end of the first tubular segment inserts within an end of the second tubular segment to interconnect the first and second tubular segments.

3. The router of claim 2 wherein:
   an end of the second tubular segment inserts within an end of the third tubular segment to interconnect the second and third tubular segments.

4. The router of claim 1 further comprising:
   a fourth tubular segment, wherein a latch of the fourth tubular segment connects to a connector hole of the third tubular segment to interconnect the third and fourth tubular segments.

5. The router of claim 1 further comprising:
   a fourth tubular segment, wherein a latch of the third tubular segment connects to a connector hole of the fourth tubular segment to interconnect the third and fourth tubular segments.

6. A router comprising:
   a plurality of tubular segments interconnected to one another, each tubular segment surrounding an interior which accommodates fiber optic jumpers within the tubular segment;
   wherein a latch of a first one of the tubular segments connects to a connector hole of a second one of the tubular segments to interconnect the first and second tubular segments; and
   at least one post associated with at least one of the tubular segments for mounting the router to a given surface.

7. The router of claim 6 wherein:
   an end of the first tubular segment inserts within an end of the second tubular segment to interconnect the first and second tubular segments.

8. The router of claim 6 wherein:
   the tubular segments include straw-type tubular segments having straight configurations, wherein the straw-type tubular segments include connector holes.

9. The router of claim 6 wherein:
   the tubular segments include junction mule-type tubular segments having straight configurations, wherein latches are connected to at least some of the junction mule-type tubular segments.

10. The router of claim 6 wherein:
the tubular segments include anchor-type tubular segments having different configurations including at least one of curved, S-bend, 90° bend, tee, and splitter configurations.

11. The router of claim 10 wherein:
latches are connected to at least some of the anchor-type tubular segments.

12. The router of claim 10 wherein:
connector holes are provided in at least some of the anchor-type tubular segments.

13. A router comprising:
a plurality of tubular segments interconnected to one another, each tubular segment surrounding an interior which accommodates fiber optic jumpers within the tubular segment;
wherein a latch of a first one of the tubular segments connects to a connector hole of a second one of the tubular segments to interconnect the first and second tubular segments; and
wherein the tubular segments have slits which open and close to enable placement of fiber optic jumpers within the interiors of the tubular segments.

14. The router of claim 13 wherein:
an end of the first tubular segment inserts within an end of the second tubular segment to interconnect the first and second tubular segments.

15. The router of claim 13 wherein:
the tubular segments include straw-type tubular segments having straight configurations, wherein the straw-type tubular segments include connector holes.

16. The router of claim 13 wherein:
the tubular segments include junction mule-type tubular segments having straight configurations, wherein latches are connected to at least some of the junction mule-type tubular segments.

17. The router of claim 13 wherein:
the tubular segments include anchor-type tubular segments having different configurations including at least one of curved, S-bend, 90° bend, tee, and splitter configurations.

18. The router of claim 17 wherein:
latches are connected to at least some of the anchor-type tubular segments.

19. The router of claim 17 wherein:
connector holes are provided in at least some of the anchor-type tubular segments.

20. The router of claim 13 further comprising:
at least one post associated with at least one of the tubular segments for mounting the router to a given surface.

* * * * *